United States Patent [19]

Robert

[11] 4,150,834
[45] Apr. 24, 1979

[54] FACED-RING SEAL WITH DIAPHRAGM

[75] Inventor: Bernard Robert, Meudon la Foret, France

[73] Assignee: Regie Nationale des Usines Renault, Boulogne-Billancourt, France

[21] Appl. No.: 901,631

[22] Filed: May 1, 1978

[30] Foreign Application Priority Data

May 3, 1977 [FR] France .................. 77 13371

[51] Int. Cl.² .................. F16J 15/36; F16J 15/38
[52] U.S. Cl. .................. 277/88; 277/92
[58] Field of Search .................. 277/88–92, 277/102

[56] References Cited

U.S. PATENT DOCUMENTS 2,806,720  9/1957  Meyer .................. 277/89 X

FOREIGN PATENT DOCUMENTS

| | | | |
|---|---|---|---|
| 144296 | 11/1951 | Australia | 277/90 |
| 528972 | 6/1954 | Belgium | 277/88 |
| 827589 | 1/1952 | Fed. Rep. of Germany | 277/88 |
| 865844 | 2/1953 | Fed. Rep. of Germany | 277/88 |
| 1061144 | 7/1959 | Fed. Rep. of Germany | 277/88 |
| 2201664 | 7/1972 | Fed. Rep. of Germany | 277/88 |
| 2216909 | 11/1972 | Fed. Rep. of Germany | 277/88 |
| 716409 | 10/1954 | United Kingdom | 277/88 |
| 832178 | 4/1960 | United Kingdom | 277/90 |
| 944360 | 12/1963 | United Kingdom | 277/88 |

Primary Examiner—Robert S. Ward, Jr.
Attorney, Agent, or Firm—Oblon, Fisher, Spivak, McClelland & Maier

[57] ABSTRACT

A faced-ring seal with diaphragm, the elastic means of holding the moving faced ring against the stationary one consisting of an initially flat annular diaphragm, fixed at its periphery to the stationary support. The static sealing means being a pliable elastic O-ring in simultaneous contact with the diaphragm near its inner rim, with a cylindrical boring in the support and with an exterior conical bearing surface on the stationary faced ring on the side away from its surface of contact with the moving faced ring.

5 Claims, 2 Drawing Figures

FACED-RING SEAL WITH DIAPHRAGM

BACKGROUND OF THE INVENTION

1. Field of the Invention

The present invention relates to machine tools and, in particular, to the sealing of boring spindles.

2. Description of the Prior Art

The sealing of boring spindles is presently done either with seals having elastic lips (made of rubber derivatives or of plastic materials), or with baffles, or with conventional faced ring seals.

The problem posed by boring spindles are of three types:
 (a) the need for the best possible seal for preventing the entry of external agents (fluids or solids) into the bearings, and the consequent leakage of lubricants,
 (b) the reduction of the power dissipated by friction to a minimum value in order to avoid heating of the spindle, detrimental to the precision of the latter,
 (c) reduction to a minimum of the external overhang of the bearings (on the tool-holder side and on the drive pulley side), in order to increase the rigidity of the spindle and, consequently, its precision.

None of the solutions presently utilized responds totally to these three points. Actually, the seal with lips lead to much friction, difficulties in centering with respect to the axis of rotation, and much wear of the contacting parts; the baffles provide only imperfect sealing; finally, the conventional faced ring seals entail considerable axial bulk.

SUMMARY OF THE INVENTION

The aim of the invention is to remedy the above drawbacks by solving at once the three problems indicated above.

This aim is achieved according to the invention:
 (a) by the maintaining in contact of two flats (faces) assuring, on the one hand, complete sealing and, on the other, three degrees of freedom of the seal thus constituted (rotation, radial slippage, and going out of true),
 (b) by the selection of materials of low coefficient of friction and of high resistance to wear,
 (c) by the use, to ensure permanent contact of the ring faces, of a metal diaphragm spring under constraint concentric with the faces, thereby limiting the axial thickness of the sealing systems to the thickness of the faced rings, or essentially that of a lip seal or of a set of baffles,
 (d) finally, by using a static O-ring seal of standard type to transmit the force exerted by the diaphragm to the faced ring assembly, there are provided simultaneously, static sealing of the device, prevention of rotation of one of the faced rings, centering of the latter with respect to the axis of rotation and compensation of any imprecision in the assembly.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference characters designate the same or similar parts thereough out the figures thereof and wherein.

DESCRIPTION OF THE PREFERRED EMBODIMENT

Figure 1:
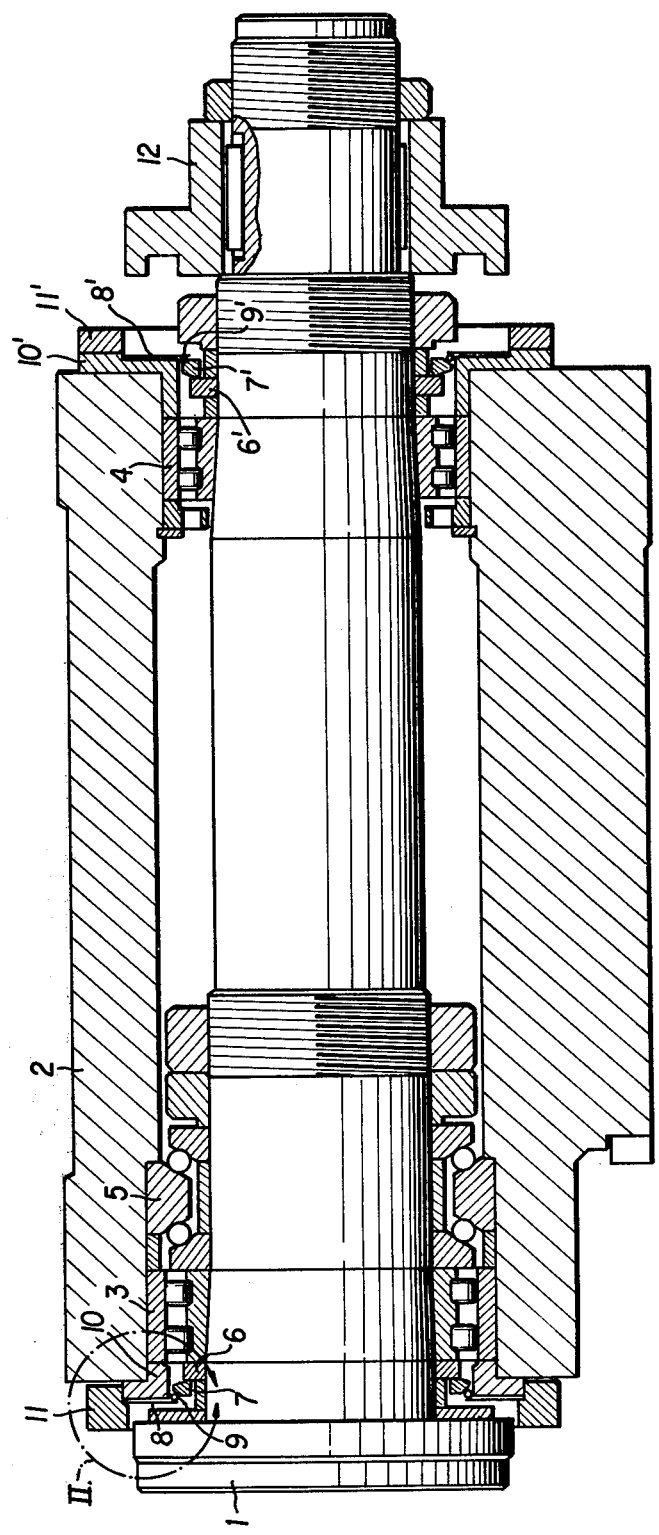
FIG. 1 is an axial section of the boring spindle.

Seen in the figures are the boring spinle 1 supported in the body 2 by cylindric roller bearings 3 and 4 and maintained in its axial position by the ball stop 5.

The arrangement comprises front 6 and rear 6' faced rings, entrained in rotation with the spindle by being clamped between spacers on the latter, and front 7 and rear 7' faced rings held fixed with respect to rotation relative to the body 2 by the O-ring seals 9 and 9'. It comprises, in addition, metaldiaphragm springs 8 and 8' mounted on the body 2 by being gripped between the flanges 10 and 10' and the clamp rings 11 and 11', as well as static O-ring seals 9 and 9' held respectively in contact with the faced rings 7 and 7', on the one hand, and the flanges 10 and 10', on the other, by the pressure exerted by the diaphragms 8 and 8'. It is also provided with drive-pulley holder 12 for the rotation of the spindle 1.

Figure 2:
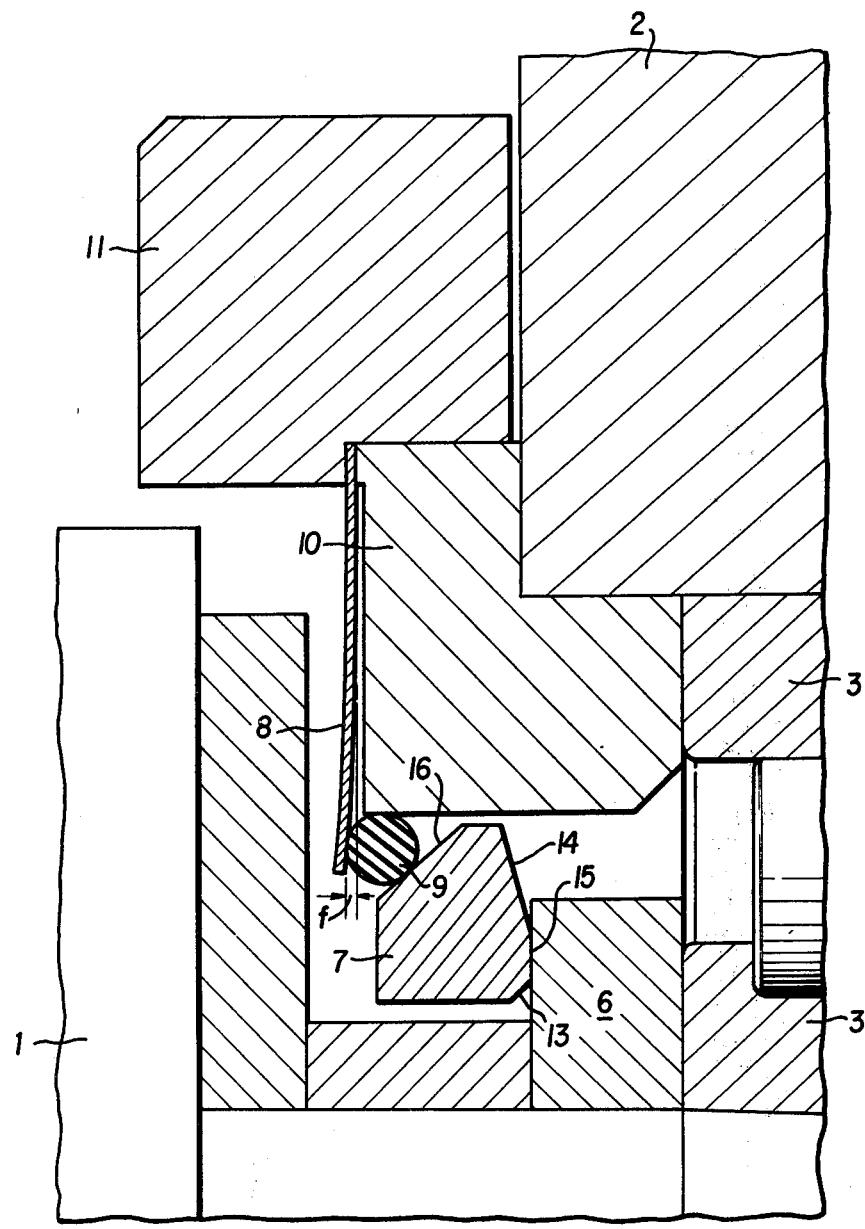
FIG. 2 shows an enlargement of the area II of FIG. 1.

In view of a certain symmetry between the two seals, it suffices to examine more closely the left part of FIG. 1 and FIG. 2. The dynamic sealing is obtained by permanent contact between the flat of the faced ring 6, integral with the rotating part, and the flat of the faced ring 7, integral with the stationary part. The contact thus constituted must be perfectly planar.

To limit the friction toruqe, one can vary the contact surface area, the contact pressure, or even the coefficient of friction of the materials in contact. The contact area can be reduced by providing the stationary faced ring 7 with two conical surfaces 13 and 14 surrounding a narrow plane bearing surface 15.

With regard to the coefficient of friction, an advantageous solution is obtained by coating the contact flats with "HEXAPLASMAS", materials of low coefficient of friction and great hardness.

Static sealing is achieved by holding the O-ring 9 in contact with the cylindrical bore of flange 10 and with an outer conical bearing surface 16 of the faced ring 7.

The different elements of the sealing system (faced rings 6 and 7, seal 9, and flange 10) are maintained in constant contact thanks to the pressure exerted by the diaphragm 8 through the intermediary of the O-ring seal 9.

This pressure is obtained through an initial deformation "f" of the diaphragm corresponding to the difference in deflection between the outer plane of support of this on the flange 10 and the plane of pressure on the O-ring seal 9, the diaphragm being assumed to be flat at rest, with the object of simplifying its fabrication.

This pressure can be changed at will by the variation of "f", the choice of the material of which the diaphragm is made, and the choice of the dimensions of the diaphragm (outer diameter, thickness).

The force exerted by the diaphragm 8 on the O-ring seal 9 is passed on by the latter as two components one, applied to the cylindrical bore of the flange 10, the other, applied to the conical bearing surface of faced ring 7.

These two components assure the static sealing of the arrangement by the crushing of the O-ring 9 against these two surfaces. They also assure the prevention of rotation of the faced ring 7 due to the friction forces on the bore 10 and the surface of 7, the torque of which is greater than the friction torque between the faced rings 6 and 7 in the sealing plane, and constant contact between the faced rings 6 and 7.

Moreover, the force exerted by the diaphragm 8 being equally distributed over the circumference of contact with the seal 9, the radial components exerted by 9 on the faced ring 7 balance out and, in this way, center this latter correctly with respect to the axis of rotation.

Finally, by its very nature, the O-ring seal 9 damps any vibrations due to imprecision in assembly or spindle deformations.

The seal of the invention thus exhibits numerous advantages, which are:

(a) a total response to the three problems posed by boring spindles: complete sealing, reduced heating, and reduced axial bulk.

(b) great simplicity in design thanks to annular and plane bodies of revolution.

(c) great simplicity of assembly: no special equipment, no risk of damage during assembly.

(d) finally, great flexibility in use due to the fact that the material of the faced rings can be adapted to the physical and chemical conditions of use and that the same is true for the diaphragm. In addition, this latter not being an integral part of the seal proper, its dimensions (diameters, thickness) as well as its initial constraint may be chosen according to each particular case of application.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A faced-ring seal with diaphragm intended to provide the sealing between a rotating spindle and its stationary support bearing, by mutual flat contact of a rotating faced ring integral with the spindle and a fixed nonrotating faced ring, coupled by a static sealing arrangement to the bearing support and pressed elastically and axially against the moving faced ring, characterized by the fact that the arrangement for elastic application of the fixed faced ring is constituted of an annular diaphragm, initially flat, fastened at its periphery to the said support, and that the static sealing arrangement consists of a flexible elastic annular seal in contact simultaneously with the diaphragm near its inner rim, with a cylindrical bore in the support, and with an outer conical bearing surface on the fixed faced ring opposing its surface of contact with the moving faced ring, the whole being designed so that the friction torquesof the annular seal on the bore and on the fixed faced ring exceed the friction torque of the moving faced ring on the fixed one in order to immobilize the latter in rotation by this effect alone.

2. A faced-ring seal as in claim 1, characterized by the fact that the fixed faced ring has a plane annular area of reduced width for contacting the moving faced ring, and surrounded outwardly and inwardly by conical surfaces on the fixed ring.

3. A faced-ring seal as in claim 1 characterized by the fact that at least one of the surfaces of contact between the fixed and moving faced rings is coated with a material of low coefficient of friction and great hardness, such as one of the products sold under the trade name "HEXAPLASMAS".

4. A faced-ring seal as in claim 1, characterized by the fact that the annular seal is an O-ring seal.

5. A faced-ring seal as in claim 4, characterized by the fact that the O-ring is made of an elastomer.

* * * * *